UNITED STATES PATENT OFFICE.

WILLIAM A. HALL, OF BELLOWS FALLS, VERMONT.

PAINT COMPOSITION.

No. 797,683.  Specification of Letters Patent.  Patented Aug. 22, 1905.

Application filed May 13, 1904. Serial No. 207,843.

*To all whom it may concern:*

Be it known that I, WILLIAM A. HALL, a citizen of the United States, residing at Bellows Falls, in the county of Windham and State of Vermont, have invented or discovered certain new and useful Improvements in Paint Compositions, of which the following is a specification.

This invention or discovery relates to a paint composition containing oil, but suitable to be mixed up with water to form what is known as a "water-paint," and which is of such a character that when applied to surfaces to be coated it will be water-resisting and will withstand the action of the weather.

This improved paint composition, containing, as it does, a certain percentage of oil, forms a coating tougher or more tenacious than the water-paints now generally in use, and is therefore much less liable to wash off.

The improved paint composition comprises a mineral or earthy base, as whiting or talc, (preferably whiting,) a vegetable oil, which may be either an oxidizing oil, such as linseed or Chinese tong or tung oil, or a non-oxidizing oil, such as cotton-seed oil or Indian-corn oil. If an oxidizing oil be used in the paint composition, such oil will become oxidized when applied to the surfaces to be coated and exposed to the air; but if a non-oxidizing oil be employed in the paint composition some oxidizing agent, such as alkalized casein, should be used in connection with it for the purpose of rendering it oxidizable when exposed to the air.

The improved dry paint composition will preferably consist of about two hundred parts of a mineral or earthy base, preferably whiting, about twenty-five parts of a vegetable oil, preferably Indian-corn oil, about ten parts of an animal adhesive, as glue or alkalized casein, preferably the latter. To these ingredients will preferably be added about one and a half parts formaldehyde, which, having an acid reaction, will neutralize the alkali employed with the casein and render the composition either neutral or slightly acid, about two parts of potassium oxalate, about two parts boracic acid, and about one part creosote. Some or all of the four ingredients last specified may, however, be omitted from the composition, although it is better to use them, particularly the formaldehyde and the potassium oxalate.

The ingredients composing the novel paint composition will be thoroughly incorporated together, and when the composition is placed on the market it will preferably be packed in air-tight receptacles, so that it will not deteriorate by exposure to the air. The composition comprising the stated ingredients will be practically in dry condition and when desired for use will be mixed with about an equal part, by weight, of water to form what will practically be a water-paint. In thus mixing up the dry paint composition with water for use the animal adhesive which it contains will combine with the oil, water, and mineral base in such a manner as to prevent frothing and enable the paint to flow or spread readily.

The improved paint herein described is not waterproof when first applied to the surfaces to be coated even after it is first dried, but will become oxidized by exposure to the air after a little time, so as to be very weather-resisting and waterproof, such weather-resisting or waterproof qualities becoming more pronounced with a continuation of the exposure of the dried paint to the air.

The novel paint composition herein described is not to be understood as being limited to the exact proportions herein stated of the several ingredients, as these may be varied considerably within certain limits without departing from the invention. Also instead of the particular vegetable oils or animal adhesives herein stated other equivalent vegetable oils or animal adhesives might be used.

Having thus described my invention or discovery, I claim and desire to secure by Letters Patent—

1. A paint composition, in a practically dry condition, comprising a mineral or earthy base, as whiting or talc, a vegetable oil, an animal adhesive and formaldehyde.

2. A paint composition, in a practically dry condition, comprising a mineral or earthy base, as whiting or talc, a vegetable oil, an animal adhesive, and potassium oxalate.

3. A paint composition, in a practically dry condition, comprising a mineral or earthy base, as whiting or talc, a vegetable oil, an animal adhesive, formaldehyde and potassium oxalate.

4. A paint composition, in a practically dry condition, comprising a mineral or earthy base, as whiting or talc, a vegetable oil, an animal adhesive, formaldehyde, potassium oxalate and boracic acid.

5. A paint composition, in a practically dry condition, comprising a mineral or earthy base, as whiting or talc, a vegetable oil, an animal adhesive, formaldehyde, potassium oxalate, boracic acid, and creosote.

6. A paint composition, in a practically dry condition, containing about two hundred parts of a mineral base, about twenty-five parts of corn-oil, and about ten parts of alkalized casein.

7. A paint composition, in a practically dry condition, containing a mineral base, corn-oil, alkalized casein, and formaldehyde.

8. A paint composition, in a practically dry condition containing a mineral base, corn-oil, alkalized casein, and potassium oxalate.

9. A paint composition, in a practically dry condition, containing a mineral base, corn-oil, alkalized casein, formaldehyde and potassium oxalate.

10. A paint composition, in a practically dry condition, containing a mineral base, corn-oil, alkalized casein, formaldehyde, potassium oxalate and boracic acid.

11. A paint composition, in a practically dry condition, containing a mineral base, corn-oil, alkalized casein, formaldehyde, potassium oxalate, boracic acid, and creosote.

In testimony whereof I affix my signature in presence of two witnesses.

WILLIAM A. HALL.

Witnesses:
FRANK N. NAY,
CLARKE C. FITTS.